United States Patent
Suzuki et al.

(10) Patent No.: US 6,578,448 B2
(45) Date of Patent: Jun. 17, 2003

(54) STEERING WHEEL

(75) Inventors: Keizo Suzuki, Niwa-gun (JP); Hiroki Mori, Niwa-gun (JP); Hisao Yamada, Niwa-gun (JP); Toshio Uka, Nangoku (JP)

(73) Assignee: Kabushiki Kaisha Tokai-Rika-Denki-Seishakusho, Aichi-ken (JP)

( * ) Notice: Subject to any disclaimer, the term of this patent is extended or adjusted under 35 U.S.C. 154(b) by 0 days.

(21) Appl. No.: 09/899,822

(22) Filed: Jul. 9, 2001

(65) Prior Publication Data

US 2002/0011130 A1 Jan. 31, 2002

(30) Foreign Application Priority Data

Jul. 10, 2000 (JP) ........................ 2000-209127

(51) Int. Cl.[7] ................................ G05G 1/14
(52) U.S. Cl. ........................ 74/552; 23/894.1
(58) Field of Search ................. 74/552, 558, 558.5; 29/894.1

(56) References Cited

U.S. PATENT DOCUMENTS 6,038,770 A  *  3/2000 Carrier ................ 29/894.1
2001/0027698 A1 * 10/2001 Fleckenstein ........... 74/552
2002/0005082 A1 *  1/2002 Suzuki et al. ........... 74/552
2002/0046620 A1 *  4/2002 Mori et al. ............. 74/552

FOREIGN PATENT DOCUMENTS

| DE | 4039138 C1 | * | 2/1992 | ........... 74/552 |
| JP | 56-79057 | * | 6/1981 | ........... 74/552 |
| JP | 63-270279 | * | 11/1988 | ........... 74/552 |
| JP | 5-56737 |  | 7/1993 | |
| JP | 11-91588 | * | 4/1999 | ........... 74/552 |

* cited by examiner

*Primary Examiner*—Vinh T. Luong
(74) *Attorney, Agent, or Firm*—Nixon Peabody LLP; Thomas W. Cole (57) ABSTRACT

In order to provide a steering wheel that can prevent chattering of a wooden member with respect to a metal core, a steering wheel comprising: an annular metal core, the metal core connecting to a vehicle; and a wooden member, the wooden member curving in a substantial arc corresponding to the metal core and having a passing hole formed therein, with the metal core passing through the passing hole; wherein a space is formed at, at least a portion of boundary between the metal core and an inner wall, forming the passing hole, of the wooden member, the space being for absorbing relative movement of the metal core and the wooden member, is provided.

5 Claims, 5 Drawing Sheets

STEERING WHEEL

BACKGROUND OF THE INVENTION

1. Field of the Invention

The present invention relates to a steering wheel in which a wooden member is mounted on a metal core.

2. Description of the Related Art

Vehicular steering wheels are disposed with, for example, an annular core made of metal, and the core connects with the vehicle. Part of the core is disposed with a wooden member for decoration and such. The wooden member is formed in an arc with respect to the metal core and has a passing hole formed in an interior thereof. The wooden member is mounted to the metal core by the metal core being substantially fitted into the passing hole. A rigid adhesive having no elasticity is disposed between the metal core and an inner wall of the passing hole formed in the wooden member. The metal core and the inner wall of the wooden member are thus adhered together by the rigid adhesive, whereby the wooden member is fixed to the metal core.

However, in such a steering wheel, the metal core and the wooden member expand and contract in response to changes in external temperature and external humidity. More precisely, the coefficients of expansion and contraction of the metal core due to changes in temperature are large, while the coefficients of expansion and contraction of the metal core due changes in humidity are quite small. In comparison, the coefficients of expansion and contraction of the wooden member due to humidity is large, while the coefficients of expansion and contraction of the wooden member due to changes in temperature are quite small. For this reason, when there are changes in external temperature and humidity, the metal core and the wooden member move relative to one another as a result of differences in respective coefficients of expansion and contraction. Moreover, because the rigid adhesive is inelastic, it becomes easy for the adhesive to the metal core and to the wooden member to exfoliate and for the gap between the metal core and the wooden member to become non-uniform, whereby the metal core and the wooden member separate from one another and chattering of the wooden member with respect to the metal core is generated.

In particular, because the amount of relative movement with respect to the metal core is large at inner sides and outer sides of the inner wall (i.e., inner and outer sides of the inner wall with respect to the boss) of the wooden member (in relation to these portions of the inner wall of the wooden member, for example, the amount of deformation of the metal core is large when the metal core expands or contracts due to changes in external temperature), there is a large amount of chattering.

SUMMARY OF THE INVENTION

In consideration of the aforementioned facts, it is an object of the present invention to obtain a steering wheel that can prevent chattering of a wooden member with respect to a metal core.

In order to achieve this object, a first aspect of the present invention is a steering wheel comprising: an annular metal core, the metal core connecting to a vehicle; and a wooden member, the wooden member curving in a substantial arc with respect to the metal core and having a passing hole formed therein, with the metal core passing through the passing hole; wherein radial direction spaces in the radial direction of the metal core are disposed between the metal core and an inner wall of the wooden member including the passing hole.

In the steering wheel of the first aspect, the metal core is passed through a passing hole in the interior of the wooden member, whereby the wooden member is mounted to the metal core.

Radial direction spaces in the radial direction of the metal core are disposed between the metal core and the inner wall of the wooden member including the passing hole. Therefore, the radial direction spaces absorb relative movement of the metal core and the wooden member when the metal core and the wooden member relatively move as a result of changes in external temperature or humidity. Accordingly, it is possible to prevent the wooden member from chattering with respect to the metal core. (It is possible to prevent backlash between the wooden member 20 and the metal core 16.)

A steering wheel according to a second aspect of the present invention comprises the steering wheel of the first aspect, wherein axial direction spaces in a steering shaft longitudinal direction are disposed between the metal core and the inner wall of the wooden member, and elastic members are disposed at areas where the radial direction spaces and the axial direction spaces border.

In the steering wheel according to the second aspect, not only are radial direction spaces disposed between the metal core and the inner wall of the wooden member, but axial direction spaces in the steering shaft longitudinal direction are also disposed between the metal core and the inner wall of the wooden member, and elastic members are disposed at areas where the radial direction spaces and the axial direction spaces border. For this reason, the radial direction spaces and the axial direction spaces absorb relative movement of the metal core and the wooden member when there are changes in external temperature or humidity. Moreover, because the elastic member expands and contracts in response to relative movement of the metal core and the wooden member, absorption of the relative movement of the metal core and the wooden member by the radial direction spaces and the axial direction spaces is not hindered. Accordingly, it is further possible to prevent the wooden member from chattering with respect to the metal core.

A steering wheel according to a third aspect of the present invention comprises the steering wheel of the second aspect, wherein the elastic member adheres the inner wall of the wooden member and the metal core.

In the steering wheel of the third aspect, because the elastic member adheres the inner wall of the wooden member and the metal core, the wooden member can be reliably adhered to the metal core.

Further, because the elastic member has elasticity, exfoliation of the elastic member to the inner wall of the wooden member and to the metal core when the metal core and the wooden member relatively move can be prevented. Accordingly, it is possible to reliably prevent the wooden member from chattering with respect to the metal core without the metal core and the wooden member separating from one another.

A steering wheel of a fourth aspect of the present invention comprises an annular metal core, the metal core connecting to a vehicle (body); and a wooden member, the wooden member curving in a substantial arc corresponding to the metal core and having a passing hole formed therein, with the metal core passing through the passing hole; wherein a space is formed at, at least a portion of boundary between the metal core and an inner wall, forming the passing hole, of the wooden member, the space being for absorbing relative movement of the metal core and the wooden member.

A steering wheel according to a fifth aspect of the present invention comprises the steering wheel of the fourth aspect, wherein an elastic member having elasticity is disposed in at least a portion of the space.

A steering wheel according to a sixth aspect of the present invention comprises the steering wheel of the fourth aspect, wherein the elastic members are disposed in positions which face each other with respect to the metal core.

A steering wheel according to a seventh aspect of the present invention comprises the steering wheel of the fourth aspect, wherein the passing hole has a substantially rectangular cross sectional configuration, and the elastic members are disposed in corner portions of the passing hole.

A steering wheel according to an eighth aspect of the present invention comprises the steering wheel of the fourth aspect, wherein the elastic member is disposed around the entire periphery of the metal core.

In the steering wheel of the fourth aspect, the metal core is passed through a passing hole in the interior of the wooden member, whereby the wooden member is mounted to the metal core.

The space is disposed at, at least the portion of boundary between the metal core and an inner wall, forming the passing hole, of the wooden member, the space being for absorbing relative movement of the metal core and the wooden member when the metal core and the wooden member relatively move as a result of changes in external temperature or humidity. Therefore, the space can absorb the relative movement of the metal core and the wooden member when the metal core and the wooden member relatively move as a result of changes in external temperature or humidity. Accordingly, it is possible to prevent the wooden member from chattering with respect to the metal core.

In the steering wheel of the fifth aspect, the elastic member having elasticity is disposed in at least the portion of the space. Therefore, the space absorbs the relative movement of the metal core and the wooden member when the metal core and the wooden member relatively move as a result of changes in external temperature or humidity. Accordingly, it is possible to prevent the wooden member from chattering with respect to the metal core. Moreover, because the elastic member expands and contracts in response to relative movement of the metal core and the wooden member, absorption of the relative movement of the metal core and the wooden member is not hindered. Accordingly, it is further possible to prevent the wooden member from chattering with respect to the metal core.

In the steering wheel of the sixth, seventh and eighth aspects, as same as the fourth and fifth aspects, the space absorbs the relative movement of the metal core and the wooden member when the metal core and the wooden member relatively move as a result of changes in external temperature or humidity. Accordingly, it is possible to prevent the wooden member from chattering with respect to the metal core. Moreover, because the elastic member expands and contracts in response to relative movement of the metal core and the wooden member, absorption of the relative movement of the metal core and the wooden member is not hindered. Accordingly, it is further possible to prevent the wooden member from chattering with respect to the metal core.

DESCRIPTION OF THE PREFERRED EMBODIMENT

Figure 1:
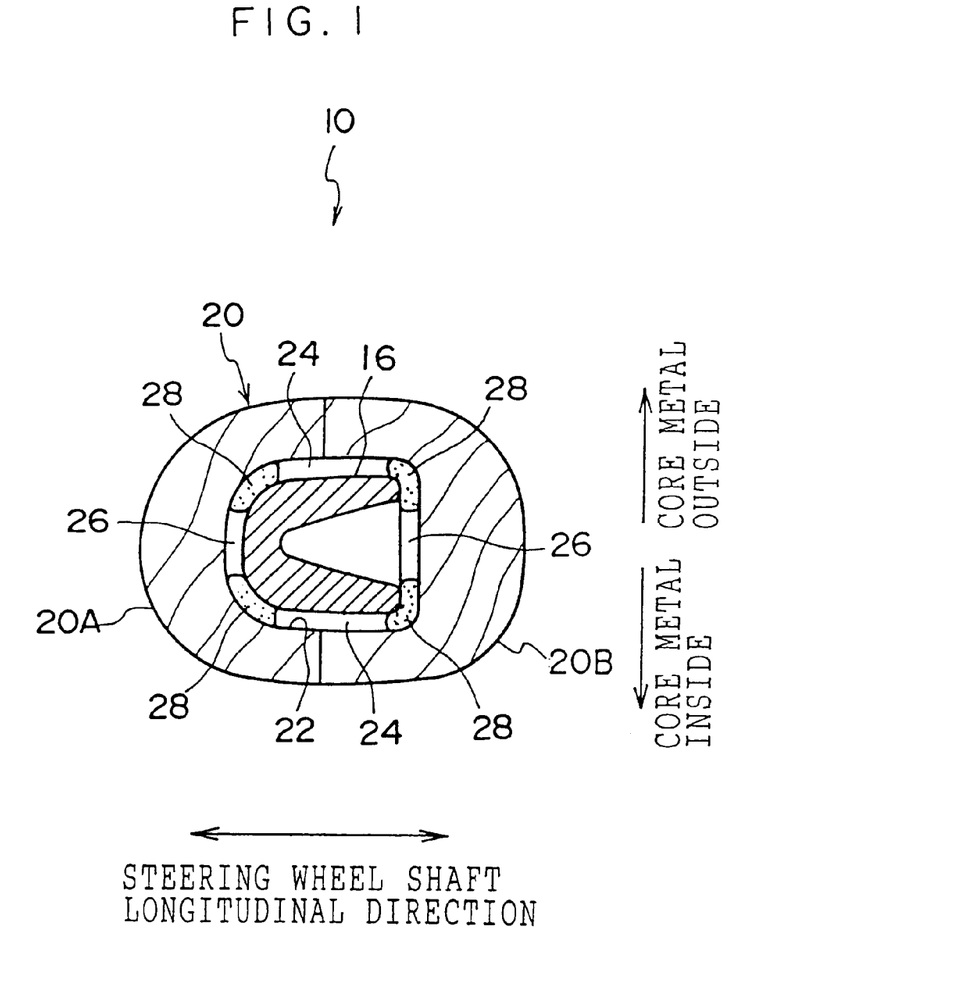
FIG. 1 is a cross-sectional view (taken along line 1—1 of FIG. 2) of main portions (metal core, wooden member and elastic adhesive) of a steering wheel pertaining to an embodiment of the present invention.
Figure 2:
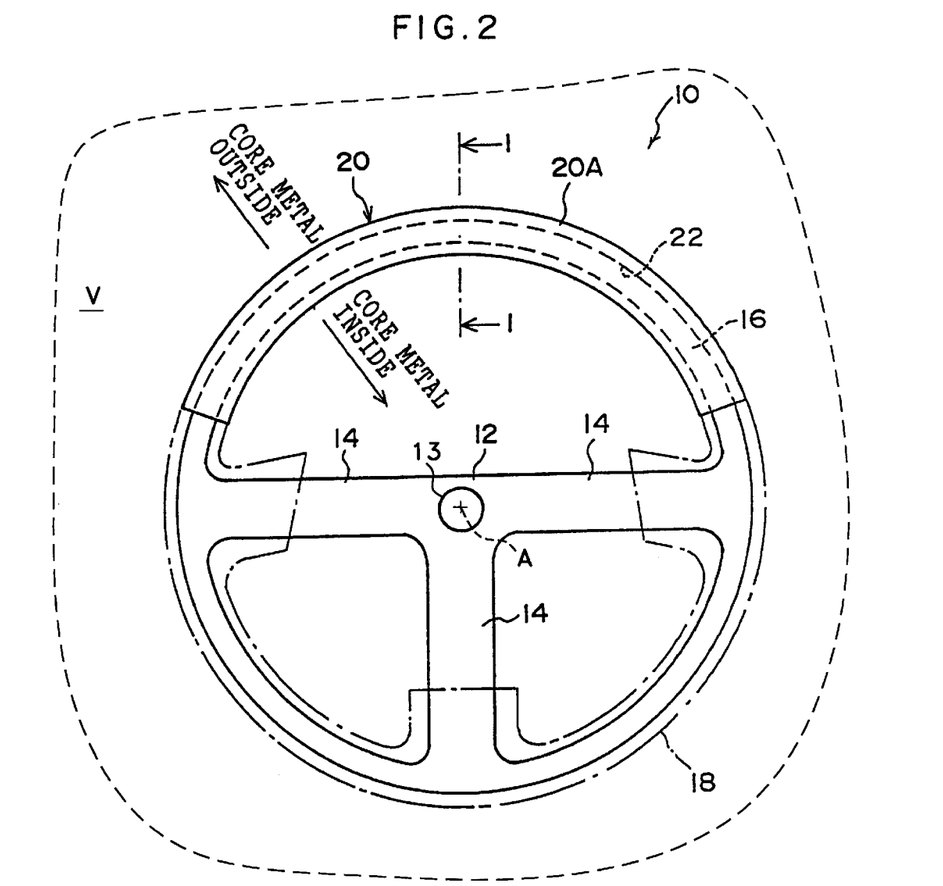
FIG. 2 is a front view of the steering wheel.

In FIG. 1, main portions of a steering wheel 10 pertaining to an embodiment of the present invention are illustrated in cross-sectional view (taken along line 1—1 of FIG. 2). In FIG. 2, the steering wheel 10 is shown in front view.

The steering wheel 10 pertaining to the embodiment of the present invention is disposed with a boss 12 that is fixed to a steering shaft 13 of a vehicle. Shaft 13 has a longitudinal axis A extending orthogonally with respect to the elevational view provided by FIG. 2. Proximal ends (with respects to the boss) of spokes 14 (three in the present embodiment) join with the boss 12. The spoke 14 extend respectively beneath, to the right of and to the left of the boss 12.

A metal core 16 (e.g., comprising magnesium) is disposed at respective distal ends of the spokes 14. Accordingly, the metal core 16 is connected to the vehicle via the spokes 14 and the boss 12. Further, the metal core 16 is formed in an annular manner when seen in front view and in a substantially U-shape when seen in cross section, and is disposed in opposition to the driver's seat.

A leather portion (leather coated portion) 18 is disposed at an area of the steering wheel 10 other than an upper area of the steering wheel 10. The leather portion 18 comprises leather which has been coated on a resin surface. The leather portion 18 encircles the metal core 16 and distal areas (i.e., distal with respect to the boss 12) of the spokes 14, whereby the leather portion 18 is mounted on the metal core 16 and the respective spokes 14. It should be noted that the leather portion 18 may also comprise a structure in which leather is not coated on a resin surface (i.e., the leather portion 18 may alternatively comprise only resin).

A wooden member 20 is disposed for decoration or such at an upper area of the steering wheel 10. The wooden member 20 curves in an arc-like manner with respect to the metal core 16. The wooden member 20 is cylindrical and has a passing hole (substantially square (rectangle) when seen in cross-section) that passes through an interior of the wooden member 20 (the peripheral wall of the passing hole will hereinafter be referred to as "inner wall 22 of the wooden member 20"). The wooden member 20 comprises a pair of pieces (piece 20A and piece 20B). Piece 20A is disposed at an upper side (vehicle occupant side) of the metal core 16 in a steering shaft direction and piece 20B is disposed at a lower side (anti-vehicle occupant side) of the metal core 16 in the steering shaft direction. By joining (adhering) piece 20A with piece 20B, a state is achieved wherein the metal core 16 is passed through the passing hole formed by the interior wall 22 of the wooden member 20 (i.e., a state in which the wooden member 20 surrounds the metal core 16), whereby the metal core 16 is mounted with the wooden member 20.

Figure 3:
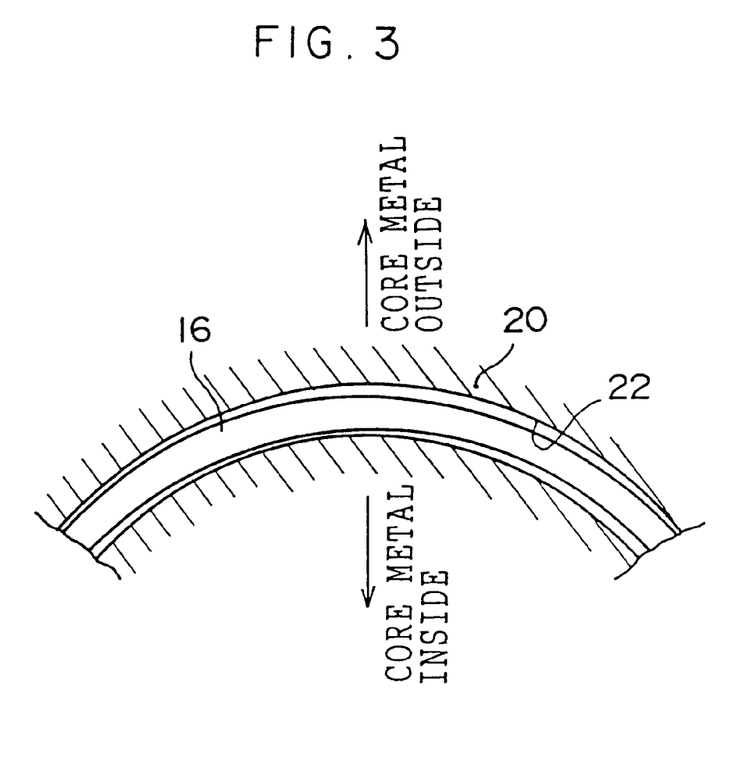
FIG. 3 is a cross-sectional view of the metal core and the wooden member at the time the metal core has expanded due to a rise in external temperature.

Between the metal core 16 and the inner wall 22 of the wooden member 20, a pair of radial direction spaces 24 are formed in the radial direction of the metal core 16. The radial direction spaces 24 are disposed at outer and inner sides of the metal core 16 (i.e., outer and inner sides of the metal core 16 with respect to the boss 12). Further, between the metal core 16 and the inner wall 22 of the wooden member 20, a pair of axial direction spaces 26 are formed in a longitudinal direction of the steering shaft. The axial direction spaces 26 are disposed at upper and lower sides of the metal core 16 in the longitudinal direction of the steering shaft (i.e., vehicle occupant side anti-vehicle occupant side). In this manner, the periphery of the metal core 16 is enclosed by the pair of radial direction spaces 24 and the pair of axial direction spaces 26. The pair of radial direction spaces 24 and the pair of axial direction spaces 26 have predetermined widths (roughly 0.5 mm in the present embodiment). Thus, when the metal core 16 and the wooden member 20 relatively move as a result of changes in external temperature or humidity (e.g., see FIG. 3 which illustrates a state in which the metal core 16 has expanded due to a rise in external temperature), the radial direction spaces 24 and the axial direction spaces 26 can absorb the relative movement.

At all areas at which the radial direction spaces 24 and the axial direction spaces 26 border, an elastic adhesive 28 (e.g., an elastomer resin) is disposed as an elastic member. The elastic adhesive 28 has an effect of adhering wood to metal, and by adhering the inner wall 22 of the wooden member 20 to the metal core 16 at four corners thereof with the elastic adhesive 28, the wooden member 20 is fixed to the metal core 16. The elastic adhesive 28 has a predetermined elasticity. Thus, when the metal core 16 and the wooden member 20 move relatively due to changes in external temperature or humidity, the elastic adhesive 28 expands or contracts in correspondence with the relative movement of the metal core 16 and the wooden member 20. Hence, relative movement of the metal core 16 and the wooden member 20 is not only allowed, but exfoliation of the adhesive to the inner wall 22 of the wooden member 20 and to the metal core 16 is prevented.

Next, operation of the present embodiment will be described.

In the steering wheel 10 comprising the structure described above, the metal core 16 is passed through the passing hole formed by the inner wall 22 of the wooden member 20, whereby the wooden member 20 is mounted on the metal core 16.

Between the inner wall 22 of the wooden member 20 and the metal core 16, radial direction spaces 24 (radial direction spaces 24 at the outer and inner sides of the metal core 16) are provided in the radial direction of the metal core 16. For this reason, when the metal core 16 and the wooden member 20 move relatively as a result of changes in external temperature or humidity, the radial direction spaces 24 absorb the relative movement of the metal core 16 and the wooden member 20 (as described later, absorption of relative movement of the metal core 16 and the wooden member 20 by the radial direction spaces 24 is not prevented by the elastic adhesive 28). Accordingly, it is possible to prevent the wooden member 20 from chattering with respect to the metal core 16. (It is possible to prevent backlash between the wooden member 20 and the metal core 16.)

Moreover, between the metal core 16 and the inner wall 22 of the wooden member 20, not only, the radial direction spaces 24 (radial direction spaces 24 at the outer and inner sides of the metal core 16) are disposed in the radial direction of the metal core 16, but also, the axial direction spaces 26 (axial direction spaces 26 at the upper side and the lower side on the metal core 16 in the longitudinal direction of the steering shaft) are disposed in the longitudinal direction of the steering shaft, and the elastic adhesive 28 is disposed at regions at which the radial direction spaces 24 and the axial direction spaces 26 border (at regions between the radial direction spaces 24 and the axial direction spaces 26). For this reason, when there are changes in external temperature and humidity, the radial direction spaces 24 and the axial direction spaces 26 absorb relative movement of the metal core 16 and the wooden member 20. In addition, because the elastic adhesive 28 expands and contracts in response to relative movement of the metal core 16 and the wooden member 20, absorption of relative movement of the metal core 16 and wooden member 20 by the radial direction spaces 24 and axial direction spaces 26 is not prevented by the elastic adhesive 28. Accordingly, it is possible to prevent the wooden member 20 from chattering with respect to the metal core 16. (It is possible to prevent backlash between the wooden member 20 and the metal core 16.)

Further still, because the elastic adhesive 28 adheres the inner wall 22 of the wooden member 20 and the metal core 16, the wooden member 20 can be reliably fixed to the metal core 20.

Since the elastic adhesive 28 has elasticity, the elastic adhesive 28 adhering to the inner wall 22 of the wooden member 20 and to the metal core 16 can be prevented from exfoliating (detaching). Accordingly, it is further possible to prevent the wooden member 20 from chattering with respect to the metal core 16 without the metal core 16 and the wooden member 20 separating from one another.

Figure 4:
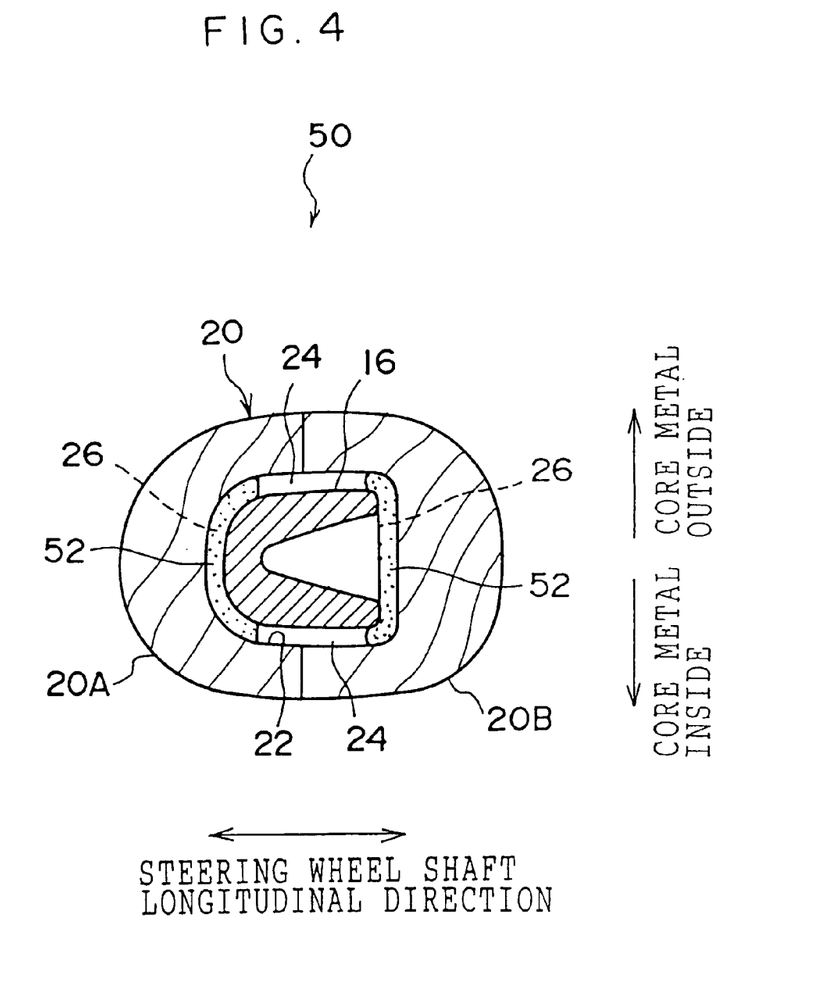
FIG. 4 is a cross-sectional view of another example of main portions (metal core, wooden member and elastic adhesive) of the steering wheel pertaining to the embodiment of the present invention.
Figure 5:
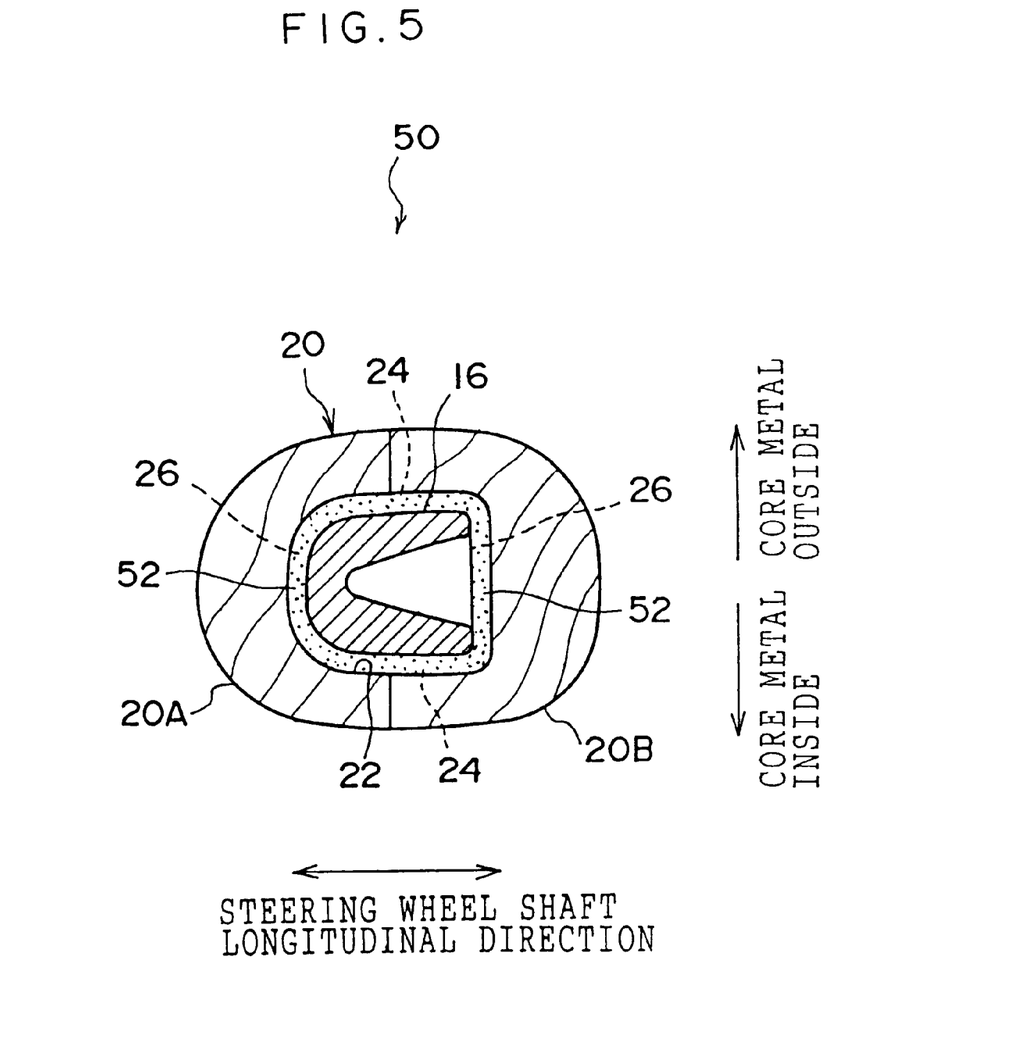
FIG. 5 is a cross-sectional view of another example of main portions (metal core, wooden member and elastic adhesive) of the steering wheel pertaining to the embodiment of the present invention.

It should be noted that, although an embodiment has been described in which the elastic adhesive 28 is disposed at four corners of the metal core 16, an elastic adhesive (elastic member) may also be disposed only at a pair of corners of the metal core that oppose each other. As in steering wheel 50 shown in FIG. 4, an elastic adhesive 52 may be disposed at vehicular front (the upper side in the longitudinal direction of the steering shaft (vehicle occupant side)) and vehicular rear (the lower side in the longitudinal direction of the steering shaft (anti-vehicle occupant side)) areas of the metal core 16 (including corners or not including corners). Furthermore, the elastic adhesive (elastic member) may alternatively be disposed at the inner and outer sides of the metal core (including corners or not including corners). Further still, as shown in FIG. 5, the elastic adhesive may be disposed around the entire periphery of the metal core.

Finally, although the wooden member 20 is disposed at an upper area (in FIG. 2) of the steering wheel 10 in the present embodiment, the wooden member may alternatively be disposed at any area(s) of the steering wheel, including disposing a wooden member at a plurality of areas of the steering wheel, or even around the entire periphery of the steering wheel.

In the steering wheel of the first aspect, because radial direction spaces in the radial direction of the metal core are disposed between the metal core and the inner wall of the wooden member including the passing hole. Therefore, the radial direction spaces absorb relative movement of the metal core and the wooden member when the metal core and the wooden member relatively move as a result of changes in external temperature or humidity. Accordingly, it is possible to prevent the wooden member from chattering with respect to the metal core.

In the steering wheel of the second aspect of the present invention, because axial direction spaces in a steering shaft longitudinal direction are disposed between the metal core and the inner wall of the wooden member, and elastic members are disposed at boundaries between the radial direction spaces and the axial direction spaces, the radial direction spaces and the axial direction spaces absorb relative movement of the metal core and the wooden member when there are changes in external temperature or humidity. Accordingly, it is further possible to prevent the wooden member from chattering with respect to the metal core.

In the steering wheel of the third aspect of the present invention, because the elastic member adheres the inner wall of the wooden member and the metal core.

In the steering wheel of the third aspect, because the elastic member adheres the inner wall of the wooden member and the metal core, the wooden member can be reliably adhered to the metal core. Further, exfoliation of the elastic member to the inner wall of the wooden member and to the metal core when the metal core and the wooden member relatively move can be prevented. Accordingly, it is possible to reliably prevent the wooden member from chattering with respect to the metal core.

What is claimed is:

1. A steering wheel comprising:
   an annular metal core, the metal core connecting to a vehicle; and
   a wooden member, the wooden member curving in an arc corresponding to the metal core and having a passing hole formed therein, with the metal core passing through the passing hole;
   wherein radial direction spaces in a radial direction of the metal core are disposed between the metal core and an inner wall, forming the passing hole, of the wooden member, and
   elastic members having elasticity are disposed in boundaries between only a portion of the radial direction space such that a remaining portion of said radial direction space constitutes a hollow, air-filled space between said core and said member,
   wherein the elastic members adhere the inner wall of the wooden member and the metal core.

2. The steering wheel of claim 1, wherein axial direction spaces in a steering shaft longitudinal direction are disposed between the metal core and the inner wall of the wooden member.

3. A steering wheel comprising:
   an annular metal core, the metal core connecting to a vehicle; and
   a wooden member, the wooden member curving in an arc corresponding to the metal core and having a passing hole formed therein, with the metal core passing through the passing hole;
   wherein a hollow, substantially air-filled space is formed at, at least a portion of boundary between the metal core and an inner wall, forming the passing hole, of the wooden member, the space being for absorbing relative movement of the metal core and the wooden member,
   wherein elastic members having elasticity are disposed in less than half of the space, and
   the elastic member adheres the inner wall of the wooden member and the metal core.

4. The steering wheel of claim 3, wherein the passing hole has a substantially rectangular cross section configuration, and the elastic members are disposed in corner portions of the passing hole.

5. A steering wheel comprising:
   an annular metal core, the metal core connecting to a vehicle; and
   a wooden member, the wooden member curving in an arc corresponding to the metal core and having a passing hole formed therein, with the metal core passing through the passing hole;
   wherein a hollow, substantially air-filled space is formed at, at least a portion of boundary between the metal core and an inner wall, forming the passing hole, of the wooden member, the space being for absorbing relative movement of the metal core and the wooden member,
   wherein elastic members having elasticity and adhering ability are disposed at, at least a portion of the hollow, substantially air-filled space to adhere the inner wall of the wooden member and the metal core.

* * * * *

UNITED STATES PATENT AND TRADEMARK OFFICE
CERTIFICATE OF CORRECTION

PATENT NO. : 6,578,448 B2  
DATED : June 17, 2003  
INVENTOR(S) : Keizo Suzuki et al.

It is certified that error appears in the above-identified patent and that said Letters Patent is hereby corrected as shown below:

<u>Title page,</u>  
Item [73], Assignee, delete "Kabushiki Kaisha Tokai-Rika-Denki-Seishakusho" add -- Kabushiki Kaisha Tokai-Rika-Denki-Seisakusho -- and -- Miroku Techno-Wood Corporation --

Signed and Sealed this

Eleventh Day of November, 2003

JAMES E. ROGAN  
*Director of the United States Patent and Trademark Office*